Patented June 16, 1953

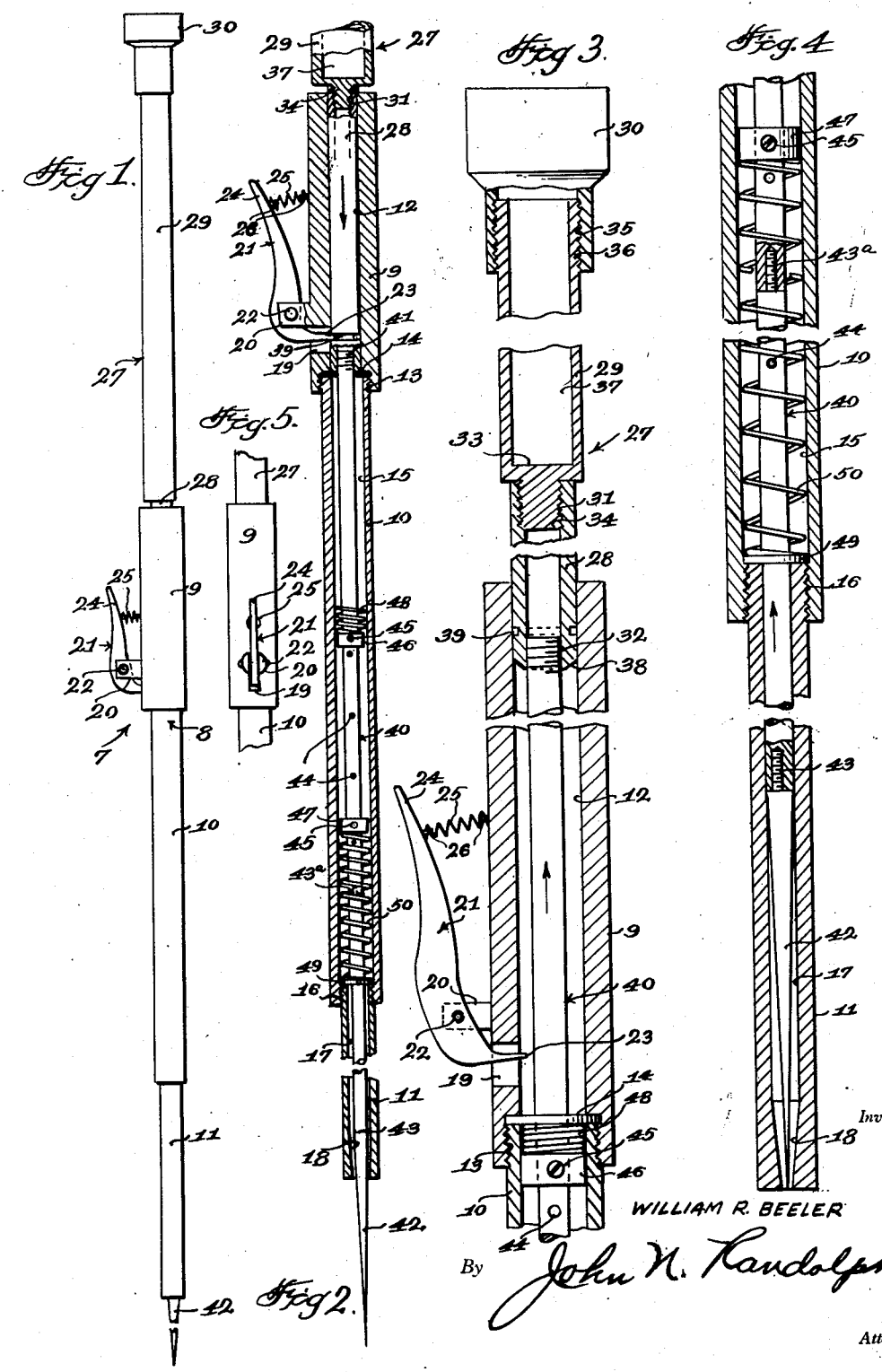

2,642,306

UNITED STATES PATENT OFFICE 2,642,306

SCRAP PAPER SPEAR

William R. Beeler, Tampa, Fla.

Application March 16, 1951, Serial No. 216,021

2 Claims. (Cl. 294—61)

This invention relates to a novel construction of spear for picking up scraps of paper, leaves, trash and other debris from lawns, parks or the like which is provided with a mechanical means for retracting the spear point for detaching the accumulated trash therefrom.

More particularly, it is an aim of the present invention to provide a spear of extremely simple construction wherein a housing is provided for substantially enclosing the movable parts of the spear to protect said parts from rust, corrosion and other foreign matter when subjected to the elements.

Another object of the invention is to provide a spring actuated spear capable of employing conventional springs of different sizes or strengths and which is readily adjustable for adapting the operating mechanism of the spear to springs of different lengths and strengths.

A further object of the invention is to provide a spear having a tapered point from which the collected trash can be most readily disengaged when the spear point is retracted.

Another object of the invention is to provide a spear including a housing portion which will effectively function to brace and reinforce the tapered spear point when the point is in a projected, operative position.

Another object of the invention is to provide a spear structure wherein the point is detachable and replaceable to enable a new point to be readily substituted for a worn, damaged or dulled point.

Another object of the invention is to provide a spear structure which may be readily disassembled and stored in a restricted space of a length considerably less than that of the overall length of the spear.

Various other objects and advantages of the invention will hereinafter become more fully apparent from the following description of the drawing, illustrating a presently preferred embodiment thereof, and wherein:

Figure 1 is an elevational view, partly broken away showing the invention in an extended position;

Figure 2 is a fragmentary longitudinal sectional view, partly in side elevation thereof and showing the spear extended;

Figure 3 is an enlarged fragmentary longitudinal sectional view partly in elevation showing the upper portion of the spear as it will appear with the parts in a retracted position;

Figure 4 is a view similar to Figure 3 but showing the lower portion of the spear, and Figure 5 is a fragmentary side elevational view looking from left to right of Figure 1.

Referring more specifically to the drawing, the spear for use in picking up trash such as scraps of paper and leaves and comprising the invention is designated generally 7 and includes a housing, designated generally 8 including tubular sections 9, 10 and 11, as best illustrated in Figure 2. The intermediate section 10 is preferably substantially longer than the upper end section 9 or the lower end section 11. The upper section 9 is preferably larger externally than the intermediate section 10 and is provided with a bore 12 extending longitudinally therethrough having an enlarged internally threaded lower end 13 for receiving the externally threaded upper end of the housing section 10 which is threaded therein for detachably connecting the housing sections 9 and 10. A washer 14 is clamped by the upper end of the section 10 in the bore portion 13 and is provided with an opening which is smaller than the bore 12 or the bore 15 in the housing section 10. The lower end of the housing section 10 is internally threaded and the upper end of the lower housing section 11 is externally threaded and threadedly engages in the lower end of the housing section 10 for detachably connecting said housing sections 10 and 11 by the threaded connection 16. The housing section 11 is smaller externally than the housing section 10 and the bore 17 thereof is substantially smaller than the bore 15 and has a restricted outwardly opening lower end defined by a frusto-conical bore portion 18.

The housing section 9 is provided with a longitudinally elongated opening 19 adjacent its lower end. A bifurcated bracket 20 is suitably connected to the housing section 9 and projects radially therefrom above and adjacent the opening 19 and provides a pivotal support for an elongated trigger or latch member 21 a portion of which is loosely disposed in the bifurcated bracket 20 and pivotally connected thereto by a pivot pin 22. The trigger 21 has a shorter curved end 23 which is tapered sharply to adjacent its terminal and said end 23 extends inwardly through the slot 19 into the bore 12. The other, handle end 24 of the trigger 21 is likewise tapered toward its terminal and extends upwardly and longitudinally with respect to the handle section 9 and is curved in a direction outwardly thereof. An expansion spring 25 is interposed between a part of the sleeve 9 and handle 24 and is supported at its ends on pins 26 which project toward one another from said parts. Accordingly, it will be readily apparent that the handle end 24 may be swung toward the sleeve 9 to swing the trigger end 23 outwardly of the slot 19 and that the spring 25 normally urges the trigger end 23 inwardly of said slot and into the bore 12.

A spear handle, designated generally 27 is preferably formed of elongated handle sections 28 and 29 and a knob or head 30. The handle section 28 is preferably tubular and sized to slidably engage the bore 12 and is provided with corresponding internally threaded upper and lower ends 31 and 32, respectively. Obviously, if desired, the handle section 30 could be a solid rod provided with internally threaded sockets 31 and 32 at the ends thereof. The upper handle section 29 is of a modified tubular construction having an end wall 33 at its lower end from which projects a threaded stem 34 which threadedly engages the threaded bore portion 30 for detachably connecting the handle sections 28 and 29 in end-to-end relationship. The knob 30 is provided with a downwardly opening internally threaded socket 35 in which the externally threaded open upper end 36 of the handle section 29 is detachably secured. The knob 30 closes the open upper end of the handle section 29 which thus forms a storage chamber 37 for spare spear points and similar articles which may be removed therefrom by detaching the knob 30. The lower end of the lower handle section 28 is externally beveled or tapered to provide an annular cam surface 38. The handle section 28 is provided with an annular groove 39 above and adjacent its cam portion 38. The handle section 28 is of sufficient length so that when its lower end is abutting the washer 14 its upper end will extend to or preferably slightly beyond the upper end of the housing section 9, as illustrated in Figures 1 and 2, and the groove 39 is spaced from the lower end so that when it is in engagement with the washer 14, as illustrated in Figure 2, the groove 39 will be disposed to receive the trigger end 23 to latch the handle 27 in its downwardly displaced position of Figures 1 and 2.

A spear rod, designated generally 40 extends longitudinally through the housing sections 10 and 11 and has an upper externally threaded end 41 extending into the housing section 9 and threadedly engaging the internally threaded end 32 of the lower handle section 28. The spear rod 40 extends slidably through the opening of the washer 14 and is supported and guided by said washer and by the bore portion 17 of the housing section 11 for sliding movement substantially axially of the bores 15 and 17. The spear rod 40 includes an elongated tapered point section 42 which is connected to the portion of the rod 40 disposed thereabove by a threaded stem and socket connection 43, as best illustrated in Figure 4 and the remaining upper portion of the spear rod 40 is formed of two sections which are detachably connected by a corresponding stem and socket connection 43a, as seen in Figure 4. The rod 40 is provided with longitudinally spaced recesses or depressions 44 to selectively receive setscrews 45 which extend radially into collars 46 and 47 for adjustably mounting the collars on the rod 40 at different longitudinally spaced points with respect to the ends of the rod. The collars 46 and 47 loosely fit for sliding movement in the bore 15. A smaller shock absorbing coiled spring 48 is supported by the upper collar 46 within the housing portion 10 above said collar. A washer 49 is loosely mounted on the rod 40 below the lower collar 47 and rests normally upon the upper end of the housing section 11. A longer relatively strong expansion coiled spring 50 is mounted on the rod 40 between the collar 47 and washer 49 and said spring 50 has flattened ends for flush engagement with the washer and collar 47. If desired, two shorter springs may be substituted for the spring 50 and disposed in end-to-end relationship. Assuming that the handle 27 is held in a lowered position as illustrated in Figures 1 and 2 by the trigger 21 engaging a part of the groove 39 so that the spear rod 40 is likewise held in a lowered, projected position, with the parts thus disposed the long tapered spear point 42 is in an unsheathed projected position, as best illustrated in Figure 2 and extends from the lower end of the housing section 11 so that the handle portion 29 can be grasped with either hand to collect trash such as scraps of paper and leaves, not shown, on the point 42 by projecting the point through the trash. The spear point 42 when in a projected position is supported by the lower end of the housing 11 due to the fact that its upper enlarged portion fits relatively snug in the restricted bore portion 18. After the exposed end of the point 42 has been substantially filled with trash it is placed over a trash receptacle and the handle portion 24 of the trigger is pressed inwardly to swing the trigger end 23 out of engagement with the latch groove 39. When this occurs, the loaded spring 50 will expand to force the spear rod 40 and handle 27 upwardly relatively to the housing 8 to cause said parts to assume the positions of Figures 3 and 4 and with the spear point 42 then sheathed within the housing section 11. As the spear point 42 is retracted into the housing section 11 it will be withdrawn for engagement with the trash thereon by the trash being held against the outer end of the housing section 11 as the point 42 is withdrawn inwardly thereof. The tapered construction of the point 42 will permit it to be readily disengaged from the trash, as will be readily apparent. To return the spear point 42 to its operative position of Figures 1 and 2, the housing 8 is grasped with one hand and the handle 27 with the other hand so that the handle 27 can be displaced toward the housing 8. This will cause the handle portion 23 to slide inwardly of the housing section 9 and as its leading end approaches the washer 14 its annular cam surface 38 will engage the trigger end 23 to displace it outwardly of the bore 12, causing the trigger 21 to rock on its pivot 22 against the action of the spring 25 in a clockwise direction. As the cam end 38 moves into engagement with the washer 14 the latch groove 39 will be disposed in registry with the slot 19 and positioned to receive the trigger end 23. The trigger 21 will then be swung counterclockwise by the spring 25 to engage the trigger end 23 in the groove 39, as illustrated in Figure 2, to latch the point 42 in a projected position. The spear 7 is made of sufficient length so that the operator may grasp the handle portion 29 and while standing in an upright position spear pieces of trash on the point 42 which are lying on the ground. As previously stated, spare spear points may be carried in the storage chamber 37 which may also house other implements such as a screwdriver, not shown. The point 42 may be readily replaced with the parts in their positions of Figures 3 and 4 by unscrewing the housing section 11 from the housing section 10 with the spear inverted and then removing the washer 49 and spring 50, or said parts 49 and 50 may be left applied while a new spear point is applied. It will also be readily apparent that the entire spear may be readily dismantled and stored in a space of a length no greater than that of the longest section of the spear.

Various modifications and changes are contemplated and may obviously be resorted to, without departing from the spirit or scope of the invention as hereinafter defined by the appended claims.

I claim as my invention:

1. A trash spear comprising an elongated tubular housing, an elongated spear rod slidably mounted in said housing having a pointed end extending from one end of the housing when the spear rod is in a projected, operative position, an elongated handle having one end slidably disposed in the housing and extending from the opposite end thereof, said handle end being detachably connected to the opposite end of the spear rod, spring means contained within said housing and urging the spear rod to a retracted position, a trigger member pivotally mounted on the housing externally thereof and having an end disposed to extend into a portion of the housing, said handle end having a trigger detent engaged by said trigger end when the spear is in a projected position, a trigger spring urging said trigger end inwardly of the housing and into engagement with the trigger detent, said housing being provided with an internally disposed stop located remote to the pointed end of the spear rod, an adjustable stop secured to the spear rod, and a cushioning spring interposed between the housing stop and said adjustable stop for cushioning the movement of the spear rod toward a retracted position under the biasing action of said spring means.

2. A trash spear comprising an elongated tubular housing, an elongated spear rod slidably mounted in said housing having a pointed end extending from one end of the housing when the spear rod is in a projected, operative position, an elongated handle having one end slidably disposed in the housing and extending from the opposite end thereof, said handle end being detachably connected to the opposite end of the spear rod, spring means contained within said housing and urging the spear rod to a retracted position, a trigger member pivotally mounted on the housing externally thereof and having an end disposed to extend into a portion of the housing, said handle end having a trigger detent engaged by said trigger end when the spear is in a projected position, a trigger spring urging said trigger end inwardly of the housing and into engagement with the trigger detent, said housing comprising an intermediate section and end sections detachably connected to said intermediate section, and said spear rod being formed of detachably connected sections including a section forming the spear point.

WILLIAM R. BEELER.

References Cited in the file of this patent

UNITED STATES PATENTS

| Number | Name | Date |
|---|---|---|
| 51,677 | Allamby et al. | Dec. 26, 1865 |
| 165,547 | Corbett | July 13, 1875 |
| 212,505 | Richmond | Feb. 18, 1879 |
| 344,566 | Cluever | June 29, 1886 |
| 889,035 | Newsom | May 26, 1908 |
| 919,750 | Neumeister | Apr. 27, 1909 |
| 1,234,794 | Orson | July 31, 1917 |
| 2,031,044 | Jensen et al. | Feb. 18, 1936 |
| 2,584,881 | Johnson et al. | Feb. 5, 1952 |